Aug. 21, 1951 T. STENNITT 2,565,406
POWER-OPERABLE WOOD-SPLITTING MACHINE
Filed July 8, 1948

Inventor:
Thomas Stennitt
By Alex. E. McRae
Attorney.

Patented Aug. 21, 1951

2,565,406

UNITED STATES PATENT OFFICE 2,565,406

POWER-OPERABLE WOOD-SPLITTING MACHINE

Thomas Stennitt, Lansdowne, Ontario, Canada

Application July 8, 1948, Serial No. 37,713

6 Claims. (Cl. 144—193)

This invention relates to power-operated wood-splitting machines.

It is an object of this invention to provide a power-operable wood-splitting machine which is simple and inexpensive to manufacture, which is effective in operation, and which is compact in dimensions and light in weight for convenience of transportation.

The invention comprises the provision of a revolubly mounted wood-splitting member, spring means for moving the member through an arcuate wood-engaging stroke, power means for moving the member through a reverse arcuate stroke against the action of the spring means, and means for automatically disengaging the member from the power means.

Figures 1, 2:
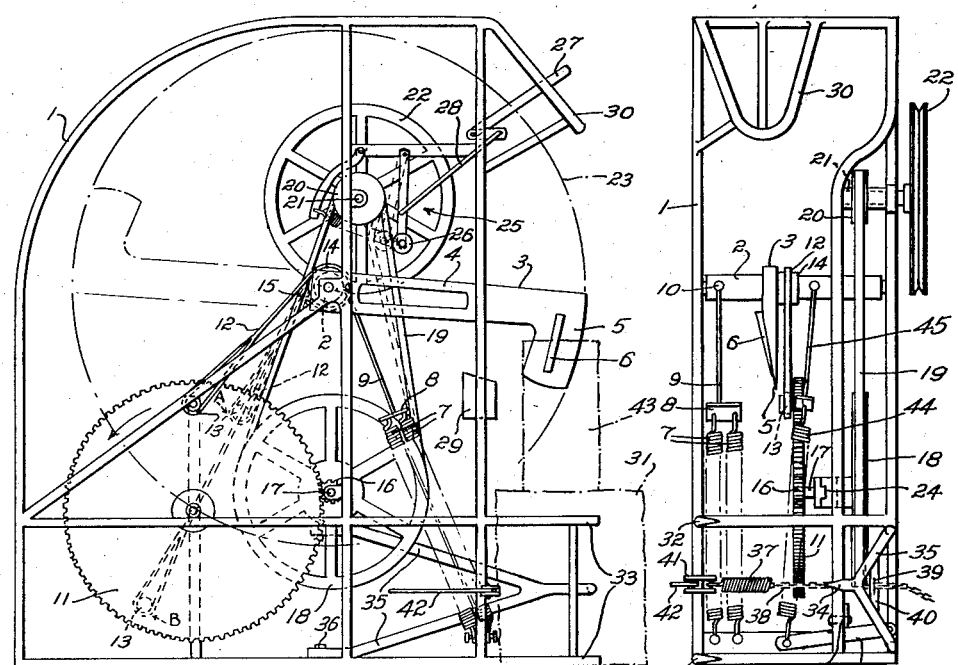
Figure 3:
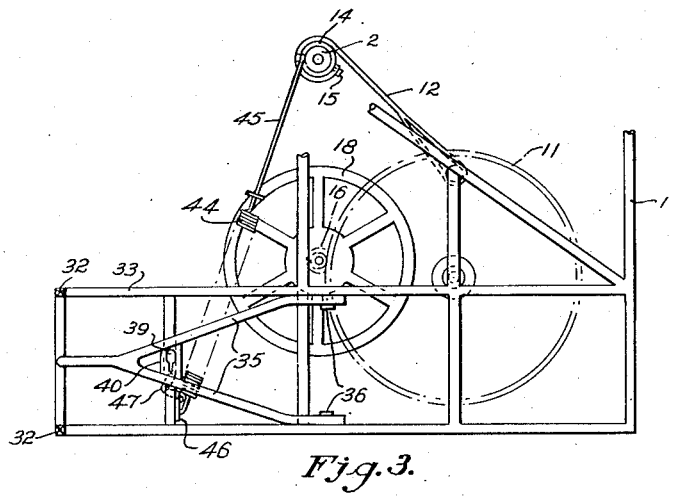

The invention will be described with reference to the accompanying drawing, in which Figure 1 is a side elevation of the machine, Figure 2 is an end elevation with certain parts removed for clarity of illustration, and Figure 3 is a side elevation of certain parts of the machine.

In the drawing, 1 is a substantially rectangular upright frame. A shaft 2 is journalled in the frame about a horizontal axis transversely of the frame. Fixed to shaft 2 is a wood-splitting member 3 having an arm 4 and an axe head 5. The head 5 has a wedge-shaped lug 6 fixed to one lateral face thereof. The shaft 2 is urged in a forward direction of movement by means of one or more springs 7 having their lower ends connected to the forward base portion of the frame and their upper ends connected to a bracket 8. A flexible chain, cable or the like 9 connects the bracket to a pin 10 fixed to the shaft.

Power means for rotating the shaft 2 in a reverse or rearward direction of movement includes a large gear wheel 11 rotatably mounted in the frame rearwardly of and below the shaft 2, and a flexible cable or the like 12 connecting the gear and the shaft. As shown, one end of the cable engages a roller 13 on the gear and adjacent the periphery thereof, and the other end is wound about an enlarged portion 14 of the shaft and is fixed to such portion at a point 15 which is substantially diametrically opposite the pin 10. It will be observed that, in the normal at rest position of the parts, as shown in Figure 1, the gear 11 is positioned with the roller 13 at its extreme upper position, the cable 12 extends over the top of portion 14 of the shaft to the point 15 on the rearward side of the shaft, and the chain connecting pin 10 is located on the forward side of the shaft.

The gear 11 is rotated in an anti-clockwise direction, as indicated by the arrow, by means of a small gear 16 fixed to shaft 17 journalled in the frame forwardly of gear 11. A large pulley 18 is connected to shaft 17 by means of a clutch 24 and is drivably connected by means of a belt 19 with a small pulley 20 fixed to shaft 21 journalled in the frame above shaft 17. Fixed to the outer end of shaft 21 is a large driving pulley 22 which is adapted to be connected to any suitable driving means, not shown, such as the drive shaft of a gasoline motor.

The size of the various gears and pulleys is chosen to provide a desired speed reduction from a conventional motor. While considerable variation is permissible to meet varying conditions, the following approximate diameters are generally suitable.

|          | Inches |
|----------|--------|
| Gear 11  | 15     |
| Gear 16  | 1¼     |
| Pulley 18| 12     |
| Pulley 20| 2½     |
| Pulley 22| 12     |

A suitable length of arm 4 of the axe is 18 inches, i. e., the head 5 is adapted to revolve through an arc 23 of approximately 18 inch radius.

Clutch 24 drivably connects pulley 18 to shaft 17 for clockwise rotation with driving pulley 22 but permits reverse rotation of pulley 18 independently of gear 16.

Suitable clutch means 25 is provided to drivably connect and disconnect pulleys 18 and 20 at the will of the operator and, as shown, comprises a belt tightener having a belt-engaging roller 26, a lever 27 and linkage 28 for moving the roller into and out of belt-tightening engagement.

A cushion block 29 is mounted in the frame to limit the downward work-engaging stroke of the axe arm. A forwardly-extending guard 30 may be provided on the upper portion of the frame.

Means for clamping a base block 31 to the frame comprises a pair of spikes 32 fixed to stationary forwardly-extending arms 33 at the base of the frame, and an opposed spike 34 fixed to a pair of arms 35 pivoted at 36 to the opposite side of the frame. A spring 37 urges the spike 34 into engagement with the block 31. One end of the spring is adjustably connected to the arms 35 by means of a chain 38 extending through a keyhole slot 39 in a plate 40 fixed to arms 35. As shown, the chain may be pulled through the slot to any required length and one or other of the links thereof locked therein. The other end of spring 37 is connected through a link 41 to a lever 42 which may be actuated to tighten the spring and chain connection and hold the spike 34 in firm engagement with the block.

In operation, a block of wood 43 to be split is placed on the base block 31. The block 43 may be conveniently held in position by the operator by means of a hand axe inserted in the block 43. With the driving pulley 22 connected to a source of power, the clutch 25 is actuated to place the various parts in driving connection. Gear 11 rotates in an anti-clockwise direction and by means of the flexible connection 12 rotates shaft 2 against the action of springs 7 and revolves the wood-splitting member 3 rearwardly through the arc 23. When gear 11 has made a half revolution, i. e., when roller 13 has revolved from position A to position B, which is its dead center point, as shown in dotted lines in Figure 1, and continues past such point, the pulling load of cable 12 on shaft 2 is suddenly released and the springs 7 act to swing the member 3 forwardly through arc 23 at great speed, such movement being permitted by clutch 24. The belt 19 allows sufficient slippage for the movement. The head 5 thus strikes the block 43 with great force to split the same. The wedge 6 assists the splitting action and throws the split piece laterally of the machine.

Means for augmenting the force of the wood-splitting stroke may be provided and includes a spring 44 having its upper end connected by a flexible chain or the like 45 to shaft 2 and its lower end connected to an arm 46 pivoted to the frame. A lever 47 pivoted to the frame may be moved into engagement with the arm 46 to lock the same against upward movement or out of engagement therewith to permit free upward swinging movement of the arm. Thus, the spring 44 may be placed into or out of tension during the reverse movement of the wood-splitting member.

The machine described may be constructed of compact dimensions and convenient weight. Satisfactory overall dimensions are length 3 feet, height 3 feet 4 inches, width 10 inches, with a total weight, exclusive of the motor, of about 100 pounds.

The use of the base block 31, with the means for clamping it to the machine, results in an effective anchoring means for the machine. It provides a raised support for the blocks to be split, so that the split pieces of wood may be thrown laterally clear of the machine. It also provides a convenient platform on which the operator may handle the wood to be split whereby he may work in an upright position. Thus, the structure results in a particularly satisfactory feeding method for the operator, who may utilize a separate axe for handling the wood pieces without direct use of the hands thereon.

What is claimed is:

1. A wood-splitting machine comprising a frame, a shaft journalled therein about a horizontal axis, a wood-splitting member fixed to the shaft, spring means for revolving said shaft and member in one direction about said axis, a wheel journalled in the frame, a flexible strip connecting a peripheral point on the wheel to the shaft, and power means for rotating the wheel to rotate the shaft through said flexible connection in the opposite direction and to place said spring under tension.

2. A wood-splitting machine comprising a frame, a shaft journalled therein about a horizontal axis, a wood-splitting member fixed to the shaft, a spring fixed to the frame forwardly of the shaft and having a flexible strip connecting the spring to one side of the shaft to cause rotation thereof in one direction, a gear journalled in the frame rearwardly of the shaft, a flexible strip connecting a peripheral point on the gear to the other side of the shaft, and means for rotating the gear to rotate the shaft through said flexible connection in the opposite direction.

3. A wood-splitting machine comprising a frame, a shaft journalled in the frame about a horizontal axis, a wood-splitting member fixed to the shaft, a spring fixed to the frame forwardly of the shaft and having a flexible strip connecting the spring to one side of the shaft, a gear journalled in the frame about a horizontal axis rearwardly of the shaft, a flexible strip connecting a peripheral point on the gear to the other side of the shaft, said strip extending around the surface of the shaft, said spring normally holding the shaft at rest with said peripheral point at its uppercenter position and means for rotating the gear to cause rotation of the shaft in one direction during downward movement of the flexible strip on the gear and to place said spring under tension, said shaft being rotatable in the reverse direction in response to the action of said tensioned spring when said peripheral point on the gear passes its lower-dead center position.

4. A wood-splitting machine comprising a frame, means for clamping a wood-supporting block to the frame, a shaft journalled in the frame about a horizontal axis, an arm having one end fixed to the shaft and an axe mounted on its free end, a wedge-shaped lug mounted on one lateral face of the axe, a spring fixed to the frame forwardly of the shaft and having a flexible strip connecting the spring to the forward side of the shaft, a gear journalled in the frame about a horizontal axis rearwardly of the shaft, a flexible strip connecting a peripheral point on the gear to the rearward side of the shaft, said strip extending over the top of the shaft, said peripheral point being normally positioned at its upper-dead center position on the gear, and means for rotating the gear in an anticlockwise direction to rotate the shaft and revolve the axe rearwardly through an arc of predetermined extent corresponding to a one-half revolution of said gear and to place the spring under tension, said shaft being rotatable in the reverse direction in response to the action of said tensioned spring to revolve the axe in the reverse direction through said arc.

5. A wood-splitting machine comprising a frame, a shaft journalled in the frame about a horizontal axis, a wood-splitting member fixed to the shaft, a spring fixed to the frame forwardly of the shaft and having a flexible strip connecting the spring to one side of the shaft, a gear journalled in the frame about a horizontal axis rearwardly of the shaft, a flexible strip connecting a peripheral point on the gear to the other side of the shaft, said strip extending over the top of the shaft, and means for rotating the shaft in one direction comprising a second shaft journalled in the frame, a gear fixed to the second shaft and meshing with the first gear, a pulley mounted on the second shaft for driving the second gear, a clutch connecting the pulley to the second shaft for rotation in one direction therewith and permitting rotation of the pulley in the other direction, a second pulley journalled in the frame, means for driving the second pulley, and means for drivably connecting and disconnecting the first and second pulleys.

6. A wood-splitting machine as defined in claim 4, including a second spring having its upper end connected to the forward side of said shaft, an arm pivoted to the frame and connected to the lower end of said spring, said arm permitting the spring to be substantially free from tension on rotation of said shaft, and means for locking the arm against movement with respect to the frame.

THOMAS STENNITT.

REFERENCES CITED

The following references are of record in the file of this patent:

UNITED STATES PATENTS

| Number | Name | Date |
|---|---|---|
| 39,420 | Pierce | Aug. 4, 1863 |
| 43,576 | Dugdale | July 19, 1864 |
| 52,215 | Silkman | Jan. 23, 1866 |
| 451,228 | Trevor | Apr. 28, 1891 |
| 507,239 | Norton | Oct. 24, 1893 |
| 629,144 | Wise | July 18, 1899 |
| 748,162 | Cheesebrough | Dec. 29, 1903 |
| 1,358,556 | Johnson et al. | Nov. 9, 1920 |
| 2,493,914 | Corey et al. | Jan. 10, 1950 |

FOREIGN PATENTS

| Number | Country | Date |
|---|---|---|
| 8,550 | Great Britain | Apr. 9, 1906 |